(12) United States Patent
Agematsu (10) Patent No.: US 7,288,869 B2
(45) Date of Patent: Oct. 30, 2007

(54) STEPPING MOTOR

(75) Inventor: Ikuo Agematsu, Nagano (JP)

(73) Assignee: NIDEC Sankyo Corporation, Nagano (JP)

( * ) Notice: Subject to any disclaimer, the term of this patent is extended or adjusted under 35 U.S.C. 154(b) by 0 days.

(21) Appl. No.: 11/372,672

(22) Filed: Mar. 10, 2006

(65) Prior Publication Data

US 2006/0202587 A1    Sep. 14, 2006

(30) Foreign Application Priority Data

Mar. 11, 2005   (JP)   .............................. 2005-068447

(51) Int. Cl.
  *H02K 1/12* (2006.01)
(52) U.S. Cl. ..................... 310/257; 310/49 R
(58) Field of Classification Search ................. 310/257, 310/214, 215, 49 R
See application file for complete search history.

(56) References Cited

U.S. PATENT DOCUMENTS

| 3,633,055 | A | * | 1/1972 | Maier ..................... 310/156.26 |
| 4,594,524 | A | * | 6/1986 | Sudo ......................... 310/68 R |
| 6,051,900 | A | * | 4/2000 | Yamaguchi .................. 310/81 |
| 6,774,512 | B2 | * | 8/2004 | Takagi et al. ............. 310/49 R |

FOREIGN PATENT DOCUMENTS

JP    2004-112985    4/2004

* cited by examiner

*Primary Examiner*—Dang Le
*Assistant Examiner*—Nguyen N. Hanh
(74) *Attorney, Agent, or Firm*—Reed Smith LLP (57) ABSTRACT

A stepping motor comprising a circular stator core having a plurality of pole teeth at an inner circumferential edge and an air core coil fitted to the periphery of the pole teeth. An insulating film is formed on the surface of the air core coil. An insulation sheet is sandwiched between an edge long the axial direction of the air coil and the stator core.

8 Claims, 7 Drawing Sheets

STEPPING MOTOR

CROSS-REFERENCE TO RELATED APPLICATIONS

This application claims priority of Japanese Application No. 2005-068447, filed Mar. 11, 2005, the complete disclosure of which is hereby incorporated by reference.

BACKGROUND OF THE INVENTION a) Field of the Invention

This invention relates to a stepping motor. More specifically, this invention relates to a method of insulation between a coil and a stator core.

b) Description of the Related Art

Generally, a stepping motor comprises a rotor part having a magnet fixed onto a stepping a stepping motor comprises a rotor part having a magnet fixed onto a rotor shaft, a stator part facing the rotor part, a circular coil bobbin, and a coil wound around the body of the coil bobbin.

In order to attain miniaturization of such a stepping motor, in the case of a motor size of less than 10 mm in diameter for example, the bobbin size has been reduced by integrating the coil bobbin into the inner stator core constituting the stator part by means of insert molding.

Furthermore, when the motor size is less than 5 mm in diameter in which a coil bobbin is molded with the inner stator core as an integrated body, the coil bobbin occupies a large proportion of the motor. As a result, the required winding space cannot be secured and the needed motor torque cannot be obtained.

To overcome this problem, an insulating film is formed on the surface of the stator core, and the coil bobbin is omitted to eliminate the proportion occupied by the coil bobbin. A stepping motor having an elongated space for coil winding has been thus developed (see Unexamined Japanese Patent Application Publication No. 2004-112985, for example). In order for a stepping motor of this type to acquire good motor characteristics, it is essential to have a magnetic coupling with little magnetic reluctance between an inner stator core and an outer stator core. Therefore, in the stepping motor shown in said Unexamined Japanese Patent Application Publication No. 2004-112985, when insulating films are formed on an inner stator core and an outer stator core, in order to secure a good magnetic coupling, a masking process is provided so that an insulation film is not formed on the junction between the inner stator core and the outer stator core.

PROBLEMS TO BE SOLVED BY THE INVENTION/DISCOVERY OF THE INVENTORS

However, in the stepping motor mentioned above, an insulating film is formed on the surface of the stator core. As a result, a masking process must be provided to the junction between the inner stator core and the outer stator core; this makes the assembly process complicated. Moreover, shifting of the mask causes formation of an insulating film on the junction, resulting in the possibility of deterioration of motor characteristics and fluctuation of characteristics from motor to motor caused by an increase in magnetic reluctance.

Furthermore, since the stator core has a complicated configuration in which a plurality of pole teeth are raised at the inner circumferential edge, there is a problem about the fact that it is difficult to form an insulating film uniformly. A thin insulating film allows burrs to conduct electricity or causes poor electric strength, whereas a thick insulating film prevents the stator core from being miniaturized; this is another problem.

Moreover, unlike a bobbin coil in which a coil is wound around the bobbin, an air core coil has windings of a coil coated with a thin insulating film only. As a result, its contact with another metallic component or assembly tools or jigs during the motor assembly may break the insulation film. Therefore, when mounting the coil-wound inner stator core, the operation must be done carefully such that it does not contact other components to break a wire; this requires a longer process time, which is another problem.

OBJECT AND SUMMARY OF THE INVENTION

Therefore, the object of the present invention is to provide a stepping motor having no possibility of the occurrence of poor insulation of the coil winding.

In order to attain this purpose, the stepping motor of the invention is characterized by the fact that it comprises a circular stator core having a plurality of pole teeth raised at the inner circumferential edge and an air core coil fitted to the periphery of the pole teeth, wherein an insulating film is formed on the surface of the air core coil, and at the same time, an insulation sheet is sandwiched between the edge along the axial direction, the air core coil and the stator core.

According to this invention, since an insulating film is formed on the surface of the air core coil fitted to the periphery of pole teeth of the stator core, an insulating film can be formed on the entire surface of the air core coil with a given film thickness, and the possibility of breaking or poor insulation can be reduced.

Furthermore, an insulation sheet is sandwiched between the edge along the axial direction of the air core coil on which the insulating film is formed and the stator core. Since this insulation sheet is more tenacious than the insulating film, even if it contacts with the burrs generated on the above-mentioned stator core, it covers them, and in the air core coil, insulation of the angled parts where the insulating film is relatively thinned can be ensured.

Furthermore, in another aspect of the invention, the stepping motor has the insulation sheet fixed onto the stator core and the edge along the axial direction of the air core coil with an adhesive.

According to the present invention, the above-mentioned insulation sheet is fixed onto the stator core and the edge along the axial direction of the air core coil with an adhesive. As a result, the air core coil is positioned on the stator core. Hence, maintaining good motor characteristics can be maintained.

Furthermore, also during operation, shifting of the air core coil along the axial direction or the radius direction and contacting the members that make up the motor can be prevented. Thus, the possibility of breaking, poor insulation, or the like can be controlled.

In a further aspect of the invention, the stepping motor has the material used for the insulation sheet being polyethylene terephthalate. In this way, an insulation sheet can be made at low cost.

According to the present invention in which the material of the insulation sheet and the insulating film is a polyimide resin, a stepping motor with excellent heat-resistance can be constructed.

Furthermore, in yet another aspect of the invention, the stepping motor further comprises another circular stator core, wherein said another circular stator core having a plurality of pole teeth raised at the inner circumferential edge being overlaid along the axial direction on the circular stator core, and wherein said another stator core and the edge of the air core coil facing the edge along the axial direction of the another stator core are in the non-contacting state.

According to the present invention, the other stator core mentioned above and the edge of the above-mentioned air core coil facing the edge along the axial direction of the said other stator core are kept in the non-contacting state with an air gap between them; this enables the stepping motor to maintain its insulation at low cost without the need for an insulation member.

The stepping motor of the present invention is characterized by the fact that it comprises a circular stator core having a plurality of pole teeth raised at the inner circumferential edge and an air core coil fitted to the periphery of the pole teeth, wherein an insulating film is formed on the surface of the air core coil, and at the same time, an insulation sheet is sandwiched between the edge along the axial direction of the air core coil and the stator core.

According to the present invention, since an insulating film is formed on the surface of the air core coil fitted to the periphery of pole teeth of the stator core, an insulating film can be formed on the entire surface of the air core coil with a given film thickness, and the possibility of breaking or poor insulation can be reduced.

Furthermore, an insulation sheet is sandwiched between the edge along the axial direction of the air core coil on which the insulating film is formed and the stator core. Since this insulation sheet is more tenacious than the insulating film, even if it contacts with the burrs generated on the above-mentioned stator core, it covers them, and in the air core coil, insulation of the angled parts where the insulating film is relatively thinned can be ensured.

DESCRIPTION OF THE PREFERRED EMBODIMENTS

Figure 1:
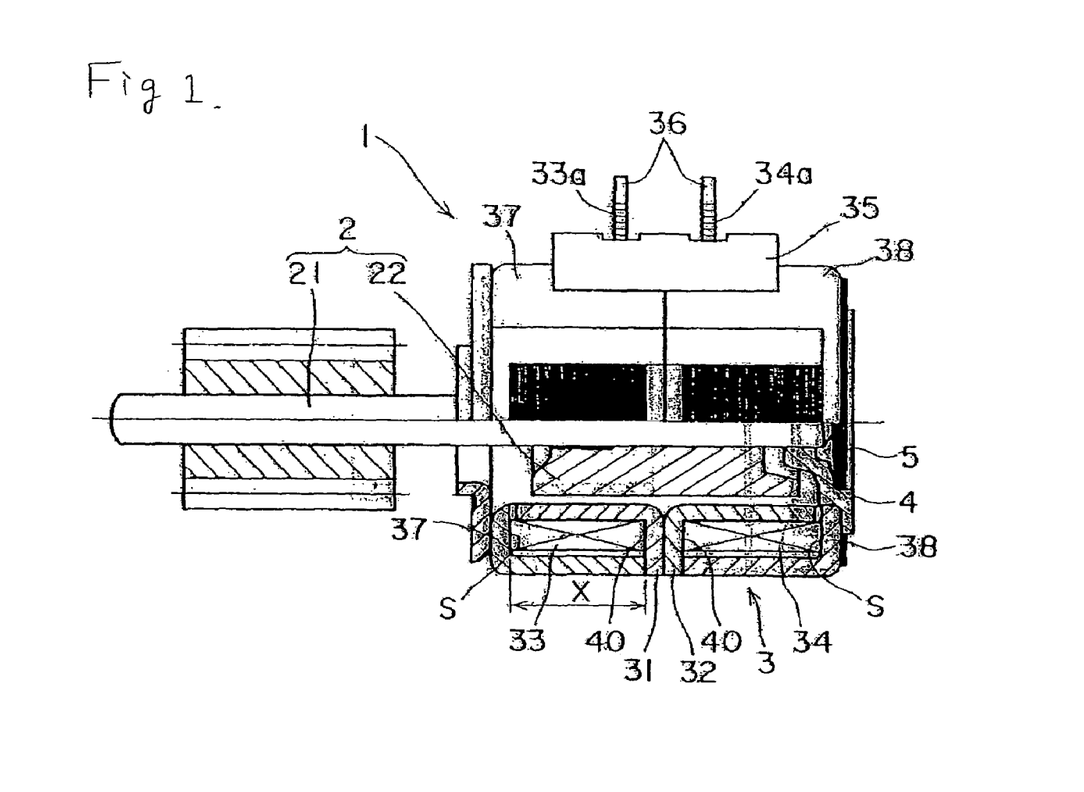
FIG. 1 is a cross-sectional side view showing the stepping motor associated with this embodiment.
Figure 2:
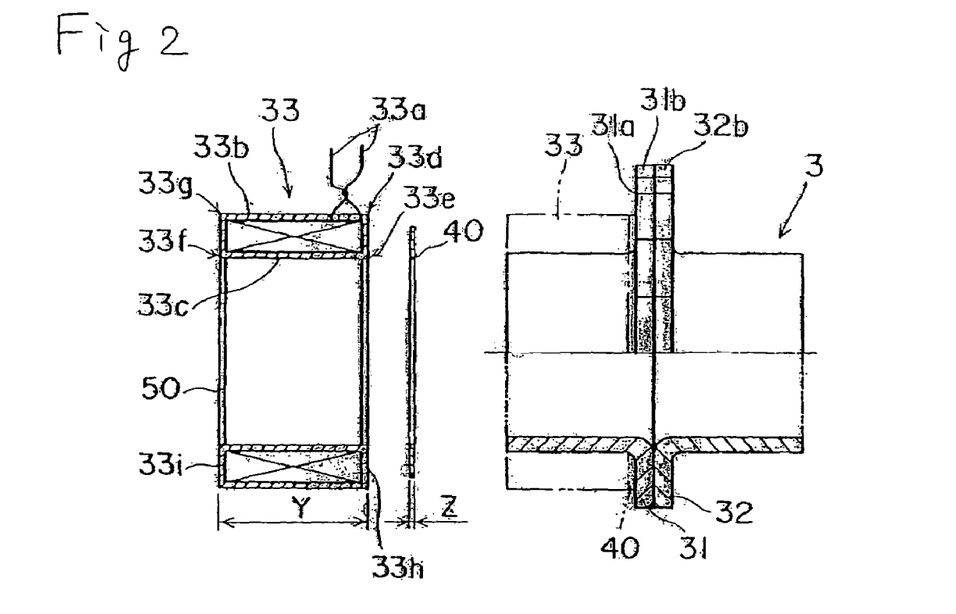
FIG. 2 is a disassembled view showing the air core coil and insulation sheet of the present invention.

FIG. 1 is a cross section of the principal part of the PM (permanent magnet) type stepping motor to which the present invention is applied. FIG. 2 is a diagram showing the structure of stator part 3 of stepping motor 1 shown in FIG. 1.

Stepping motor 1 associated with this embodiment as illustrated in FIG. 1 comprises rotor part 2 having rotor shaft 21 and rotor magnet 22, (permanent magnet) and a stator part 3 arranged opposite to rotor magnet 22 via a gap; rotor shaft 21 is rotatably supported by bearing 4 and, further, it is energized in the axial direction with spring member 5 contacting one end of rotor shaft 21. In addition, the other end side of rotor shaft 21 is rotatably supported by a bearing (not illustrated) which is different from bearing 4. This different bearing is provided, for example, at the opening at the exit end of first stator core 31, near the opening inside the mounting plate, or the tip of rotor shaft 21 via a casing (not illustrated).

To rotor shaft 21 constituting rotor part 2 fixed is rotor magnet 22 with an adhesive, wherein rotor magnet 22 is constructed with a permanent magnet in approximately a cylindrical shape.

Furthermore, circular concavities are formed on both ends of rotor magnet 22 in its axial direction. The formation of these concavities enables rotor magnet 22 to reduce the weight further. Thus, the moment of inertia of the rotor magnet 22 is reduced by means of the weight reduction.

The other end of rotor shaft 21 serves as an output axis extended to output the rotation of stepping motor 1.

Stator part 3 is made in a two-phase structure comprising first stator core 31 and second stator core 32 fixed onto first stator core 31 in back to back.

First and second stator cores 31 and 32 are constructed in such a manner that a plurality of pole teeth are alternately combined. The outer circumferences of these pole teeth and the inner clip washers between pole teeth are chamfered. As a result, the possibility of deterioration of insulation caused by burrs on pole teeth of air core coil 33 and 34 can be reduced. Therefore, it is preferable to chamfer the burrs to keep their sizes within 0.03 mm.

Circular air core coil 33 is arranged on the outer circumference of each of the pole teeth of first stator core 31, and similarly, circular air core coil 34 is arranged on the outer circumference of each of the pole teeth of second stator core 32.

Insulating films 50 for insulation enhancement are formed on the entire surfaces of these circular air core coils 33 and 34. These insulating films 50 are formed by dip coating, for example.

Furthermore, insulation sheet 40 is sandwiched between first stator core 31 and air core coil 33 and is firmly bonded to first stator core 31 and air core coil 33 with an adhesive in this embodiment. Similarly, insulation sheet 40 is bonded firmly between second stator core 32 and air core coil 34 with an adhesive.

Figure 3:
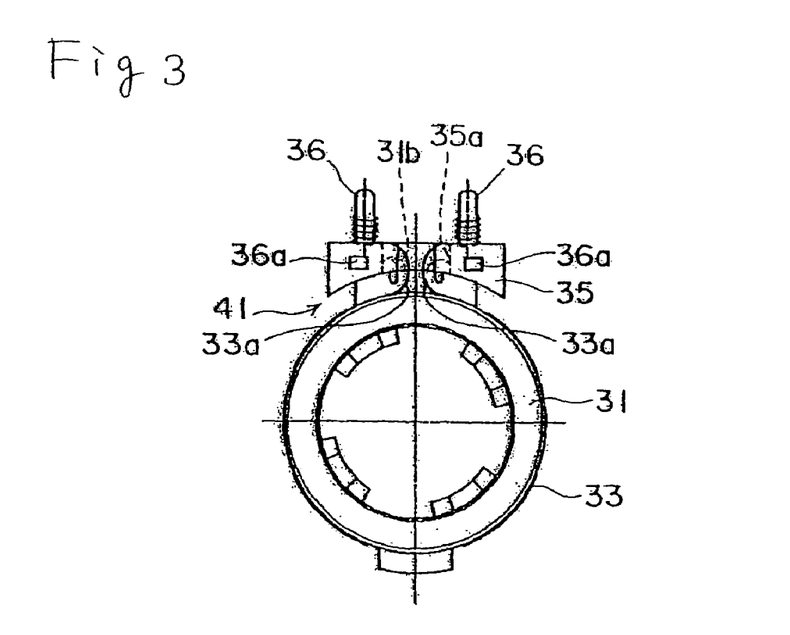
FIG. 3 is a front view showing the relationship between a terminal block and a stator.
Figure 4:
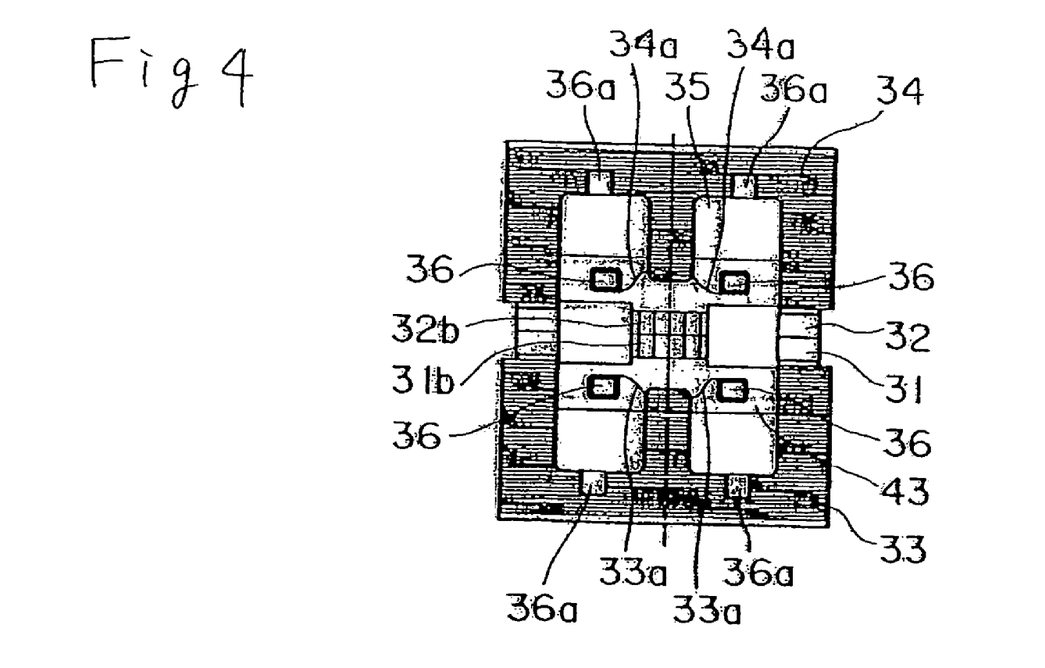
FIG. 4 is a plan view showing the relationship between a terminal block and a stator.

This stepping motor 1 comprises stator cores 31 and 32, air core coils (drive coils) 33 and 34 attached to the stator cores 31 and 32, and terminal block 35 having a plurality of terminal pins 36 for winding terminals 33a and 34a of air core coils (drive coils) 33 and 34. As illustrated in FIGS. 3 and 4, fitting part 35a of terminal block 35 is fitted to fitting parts 31b, 32b of stator cores 31 and 32, and gap 41 is provided between terminal block 35 and drive coils 33 and 34.

Figure 5:
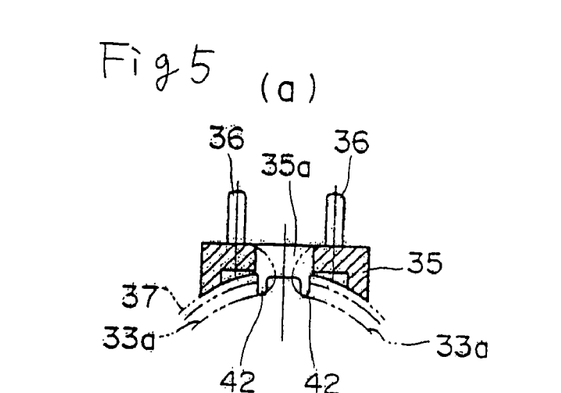
FIG. 5 is a diagram showing a terminal block; (a) is a cross section in which (b) is cut along the I-I line; (b) is a plan view; and (c) is a cross section in which (b) is cut along the II-II line; and (d) is a bottom view.

Fitting part 35a of terminal block 35 is in the form of a through hole. Moreover, fitting parts 31b and 32b of stator cores 31 and 32 are made up of projections to be pressed into fitting part 35a. This enables easy assembly of the part, and what is more, it can prevent terminal block 35 from collapsing. As shown in FIG. 5, terminal pin 36 is a metallic L-shaped pin. Terminal pin 36 is formed as terminal block 35 by insert molding with an insulation material made of a liquid crystal polymer. The use of liquid polymer provides high heat-resistance property.

Terminal pin 36 is arranged in a square configuration. This allows the length of a motor for terminal block 35 to be shorter in the circumferential direction than the case of the conventional linear arrangement. Motor 1 can thus be miniaturized.

Each terminal pin 36 is formed in parallel with the radial direction of motor 1. Base 36a of each terminal pin 36 points toward the axial direction of motor 1, and it slightly projects from terminal block 35. Since this makes wiring to base 36a possible, even if wiring cannot be provided to terminal pin 36 due to lack of installation space or the like, it can be provided to base 36a. Moreover, even after motor 1 is installed in equipment, electrical characteristics of motor 1 can be checked by utilizing base 36a. Furthermore, the L-shape of terminal pin 36 provides a significantly strong resistance to falling.

Moreover, a plurality of projections 42 are formed on the periphery of fitting part 35a of terminal block 35 on the side to be fitted to parts 31b, 32b of stator cores 31 and 32. This prevents terminals 33a and 34a of windings from touching the edge of the through hole through which the coil of motor case 37 is taken out as shown in FIG. 5(a); this prevents the wire from breakage caused by the edges. Moreover, capture of projection 42 with the edge of motor case 37 prevents terminal block 35 from falling.

Figure 6:
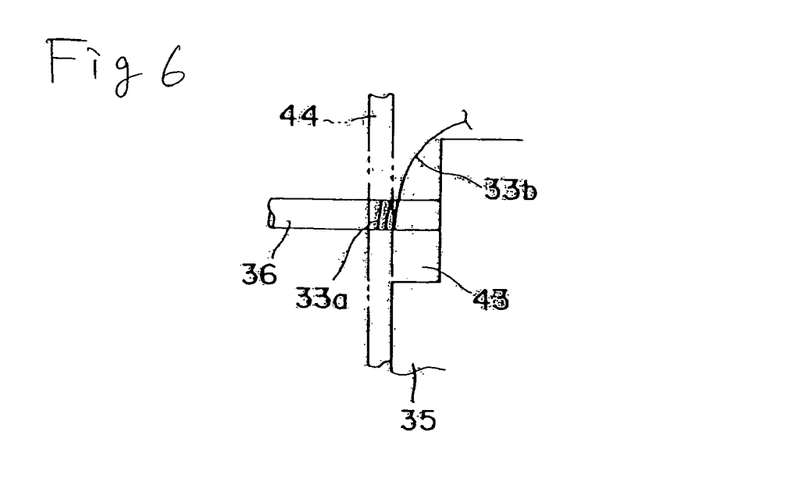
FIG. 6 is a side view showing the details of a step.

Furthermore, step 43 is formed around the terminal pin 36 of terminal block 35, and what is more, terminals 33a and 34a of windings are wound around the terminal pin 36 after being laid along step 43. As a result, as shown in FIGS. 6 and 4, since terminal 33a of winding reaches terminal pin 36 within step 43, even if a FPC44 or the like is attached later, part 33b, which is a portion right before reaching terminal pin 36 of the winding, does not interfere. This eliminates the possibility for FPC44 to break said part 33b and enables the yield in installation of motor 1 to be increased.

Furthermore, first stator core 31 is stored in the other first stator core 37, and similarly, second stator core 32 is stored in the other second stator core 38.

Furthermore, in this embodiment, the other first stator core 37 also functions as a motor case, and it is referred to as first motor case 37 hereinafter. Similarly, the other second stator core 38 is referred to as second motor case 38.

As shown in FIG. 1, first and second stator cores 31 and 32, first motor case 37, and second motor case 38 are arranged on the same concentricity of the axis of rotor shaft 21, and they are firmly bonded by welding.

Figure 7:
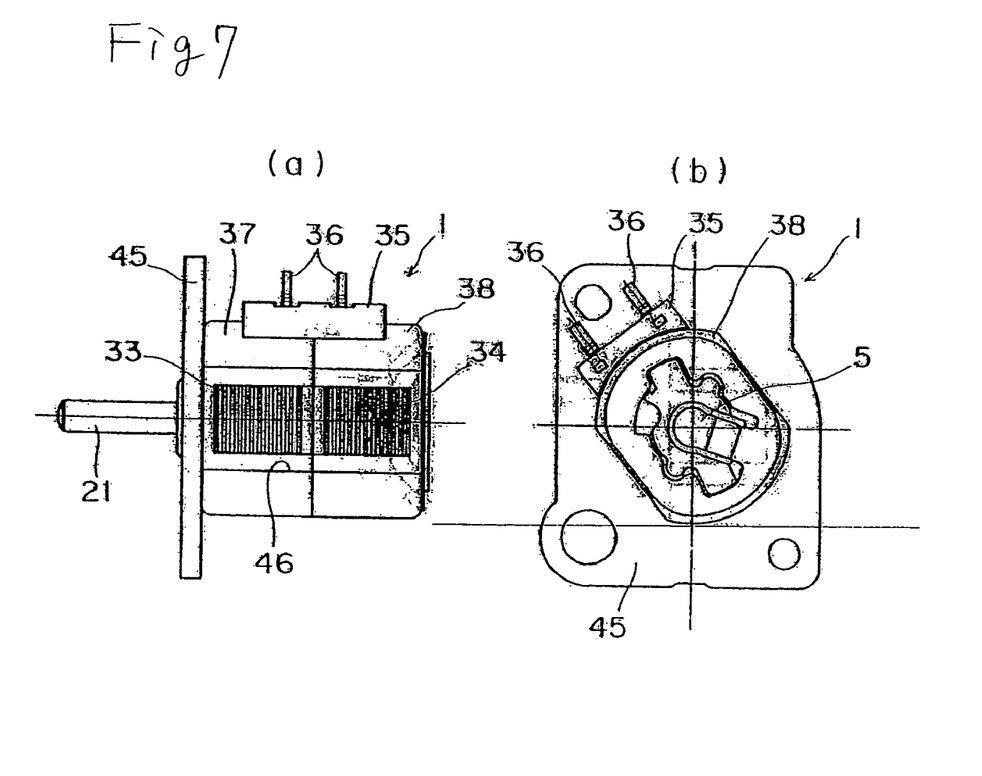
FIG. 7 is a diagram showing a motor: (a) is a side view and (b) is a bottom view.
Figure 8:
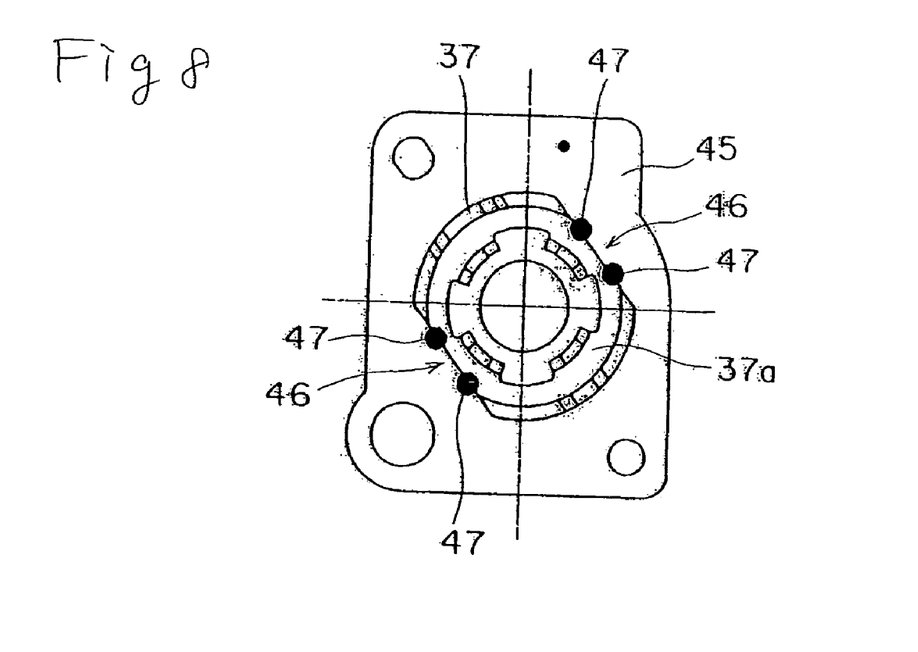
FIG. 8 is a bottom view showing the welded (locations) between a motor case and a mounting plate.
Figure 9:
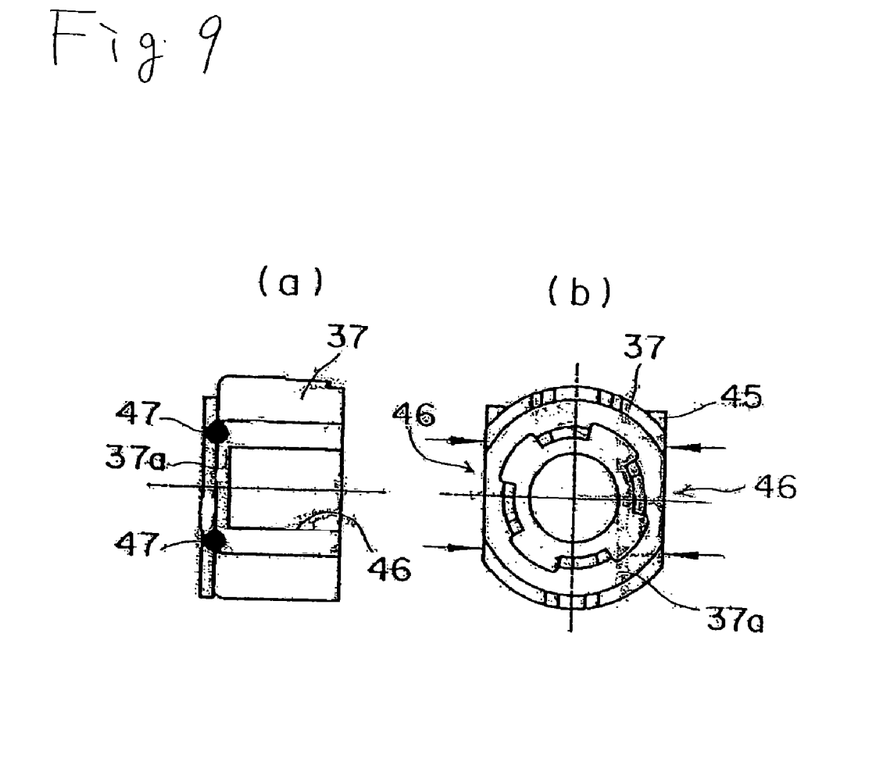
FIG. 9 is a diagram showing the welded (locations) between a motor case of another example and a mounting plate: (a) is a side view and (b) is a bottom view.

Here, as shown in FIGS. 7 and 8, motor 1 comprises motor case 37 provided with opening 46 on one side and mounting plate 45 for mounting said motor case 37, and the plane wherein the cross section of opening 46 of motor case 37 comes in contact with mounting plate 45 is fixed with the plane of mounting plate 45 by welding.

First motor case 37 is formed in a cylindrical shape with a bottom by reducing work, and the two planes facing each other on the circumferential side plane are cut in the axial direction so as to provide bottom surface 37a with an oval shape. Moreover, mounting plate 45 for installation of the motor case 37 is sufficiently larger than bottom surface 37a of motor case 37. And as shown in FIG. 8, laser welding is provided along the axial direction to the step between bottom surface 37a of motor case 37 and mounting plate 45 (Reference Numeral 47 in the figure is the point to be welded). Positions and the number of welded locations 47 can be set arbitrarily.

In this embodiment, as illustrated in FIGS. 1 and 2, the relationship among length X along the axial direction formed by first stator core 31 and first motor case 37, length Y along the axial direction of air core coil 33, and thickness Z of insulation sheet 40 is described as X>Y+Z.

In order to secure insulation between the edge along the axial direction of first motor case 37 and the edge of air core coil 33 facing the edge of first motor case 37, gap S is formed. Similarly, gap S is formed along the axial direction of second motor case 38 and air core coil 34. For this reason, between coils 33 and 34 and motor cases 37 and 38, insulation is secured by double insulation with insulating film 50 of coils 33 and 34 and gap S.

Bearing 4 is made of a resin which has lubricity and rotatably supports one end of rotor shaft 21 in the radial direction.

Formed on bearing 4 which supports (stepping motor 1) in the radial direction are a bearing part to which rotor shaft 21 is supported by insertion to the bearing, a press fitting part which is secured onto the inner diameter of second stator core 32 by press fitting, and a flange part in which a part of the outer circumference of the flange part projects in the radial direction.

The above-mentioned bearing part of bearing 4 is arranged so that it enters the concavity formed on rotor magnet 22, thereby reducing the size of the overall stepping motor 1 in the axial direction.

Furthermore, as compared to the outer diameter of rotor shaft 21, the inner diameter of the above-mentioned bearing part is larger to the degree that it can have a clearance.

Moreover, the above-mentioned flange of bearing 4 is mounted on second stator core 32 and aligned in the axial direction.

Spring member 5 is made up of a sheet of metal plate, and comprises a piece of spring contacting one end of rotor shaft 21 and a center hole. Moreover, spring member 5 is welded and fixed to second motor case 38.

The above-mentioned spring of spring member 5 contacts one end of rotor shaft 21 and energizes rotor shaft 21 in the axial direction.

Below, the air core coil constructing a stator part and the insulation sheet are explained with reference to FIG. 2.

In addition, in this embodiment, while stator part 3 comprises two sets, since they have the same structure, first stator part 3 is described here, and the description of second stator core 32 is omitted.

Air core coil 33 which is fitted to first stator core 31 is made by coating insulating film 50 onto the entire surface of a coil with a plurality of windings.

The surface of the above coil windings is provided with a thin self-fusing layer such that the self-fusing layer melts by heating and causes adjacent coil windings to be firmly bonded. Moreover, insulating film 50 formed on the entire surface of a coil with a plurality of windings is a paint containing a polyimide resin as its major component in this embodiment.

This air core coil 33 is manufactured as follows.

First, the above-mentioned coil is wound around a bar which serves as the core coil as many turns as it is required to obtain a given motor torque in such a manner that starting end 33a and finishing end 33a of the coil are exposed to the surface of the layer of windings. In addition, the outer diameter of the bar which serves as the coil core is allowed to be about the same as the outer circumference made of a plurality of pole teeth formed on first stator core 31.

Hot air blown on the coil from the outside during winding to cause self-fusing simultaneously with winding and to bond coil windings wound around the coil core. After fusing, the bar, which is the coil core, is pulled out. Thus, the coil windings form air core coil 33.

Furthermore, self-fusing of the coil may be provided, after winding a coil, by applying a given voltage between starting end 33a and finishing end 33a, feeding a current through the coil windings to generate heat, and fusing and solidifying the self-fusing layer on the surface of the coil windings, thereby bonding coil windings wound around the coil core.

Next, insulating film 50 is formed on the surface of air core coil 33 by dip coating. In short, dip coating comprises dipping of air core coil 33 into a tank containing a paint having a polyimide resin as its main component, pulling out the air core coil, and air-blowing to blow away the paint and drying the air core coil. The above-mentioned process is repeated until a given film thickness, for example, about a 30-micrometer in this embodiment is obtained. It is preferable that the thickness of an insulating film be larger than the size of a burr or dimple of a stator core to which the air core coil is fitted or firmly bonded. On the other hand, if an insulating film is too thick, the size of a coil increases. Therefore, it is preferable that the thickness of the insulating film be kept at 100 micrometers or less.

Between edge 33h along the axial direction of air core coil 33 and edge 31a of first stator core 31, insulation sheet 40 is sandwiched.

Insulation sheet 40 has a ring shape, and in this embodiment, its material is poly(ethylene terephthalate). Although its thickness is 16 micrometers in this embodiment, the withstand voltage is over 100V, which can secure good insulation characteristics. As compared to insulating film 50, insulation sheet 40 has more tenacity.

Furthermore, in this embodiment, while the inner diameter of insulation sheet 40 is almost the same as the outer circumferences of a plurality of pole teeth of the first stator core 31, and what is more, its outer diameter is smaller than the outer diameter of first stator core 31.

The use of a smaller diameter than the outer diameter of first stator core 31 enables first stator core 31 and second stator core 32 to be welded without interference.

Furthermore, air core coil 33, insulation sheet 40, and first stator core 31 are fixed with an adhesive. The fixation prevents air core coil 33 from shifting in the axial direction and contacting the edge of first motor case 37 facing in the axial direction.

Moreover, in dip coating, in comparison with outer circumference 33b and inner circumference 33c of air core coil 33, it is difficult to coat a paint on angled parts 33d to 33g; an air blow tends to blow away the paint. As a result, these angled parts 33d-33g may obtain a film thickness thinner than that of outer circumference 33b or inner circumference 33c.

In other words, when burrs and the like are left on edge 31a of first stator core 31, and while the root part of a plurality of pole teeth of first stator core 31 has an R shape, when air core coil 33 is fitted, these burrs or the R-shaped part pushes it, causing insulating film 50 to peel off; this may cause a short circuit of the coil windings with first stator core 31 or break the coil winding.

By sandwiching insulation sheet 40, since insulation sheet 40 is more tenacious than insulating film 50, even if it contacts with the burrs generated on first stator core 31, the burrs can be covered with no possibility of breakage.

For this reason, insulation sheet 40 supplements the thickness of insulating film 50 on edge 33h (including the angled part) of air core coil 33. In this way, the insulation of first stator core 31 can be secured.

When assembling the stepping motor 1 mentioned above, insulation sheet 40 is bonded firmly with an adhesive to first stator core 31 (or second stator core 32) from which first motor case 37 (or second motor case 38) is removed as shown in FIG. 2.

After bonding, air core coil 33 (or air core coil 34) is fitted to the outer circumferences of pole teeth of first stator core 31 (or the second stator core 32), thereby adhesively fixing air core coil 33. And terminal block 35 is press fitted to fitting parts 31b, 32b of each of the stator cores 31 and 32 to temporarily interlock the terminal block. Moreover, terminals 33a and 34a of each of the coils 33 and 34 are wound around terminal pin 36.

Next, first motor case 37 (or second motor case 38) is attached to build stator part 3. This stator part 3 is arranged opposite to rotor magnet 22 via a gap as shown in FIG. 1. At this point, terminal block 35 is bonded to motor cases 37 and 38 to be secured finally.

In addition, since the assembly of stepping motor 1 is the same as that of a conventional stepping motor or the like of public domain, its detailed description is omitted here.

Furthermore, although the embodiment described above is an example of preferable modes of the present invention, the present invention is not limited to this. A variety of modifications can be made within the scope of the present invention.

For example, in this embodiment, the material of the insulation sheet 40 is poly(ethylene terephthalate). However, the material is not so limited. It may be polyester, polyimide resin, and the like.

In addition, by making insulation sheet 40 using the same polyimide resin as insulating film 50, a stepping motor with excellent insulation and heat-resistance characteristics can be produced.

Moreover, in this embodiment, insulation sheet 40 is fixed with an adhesives. However, the embodiment is not limited to this, and the insulation sheet 40 may be fixed by press fitting without an adhesive.

Furthermore, in this embodiment, insulation sheet 40 has a ring shape. However, the mode of this embodiment is not limited to this, and the insulation sheet may have another shape in which it is provided partially.

Figure 10:
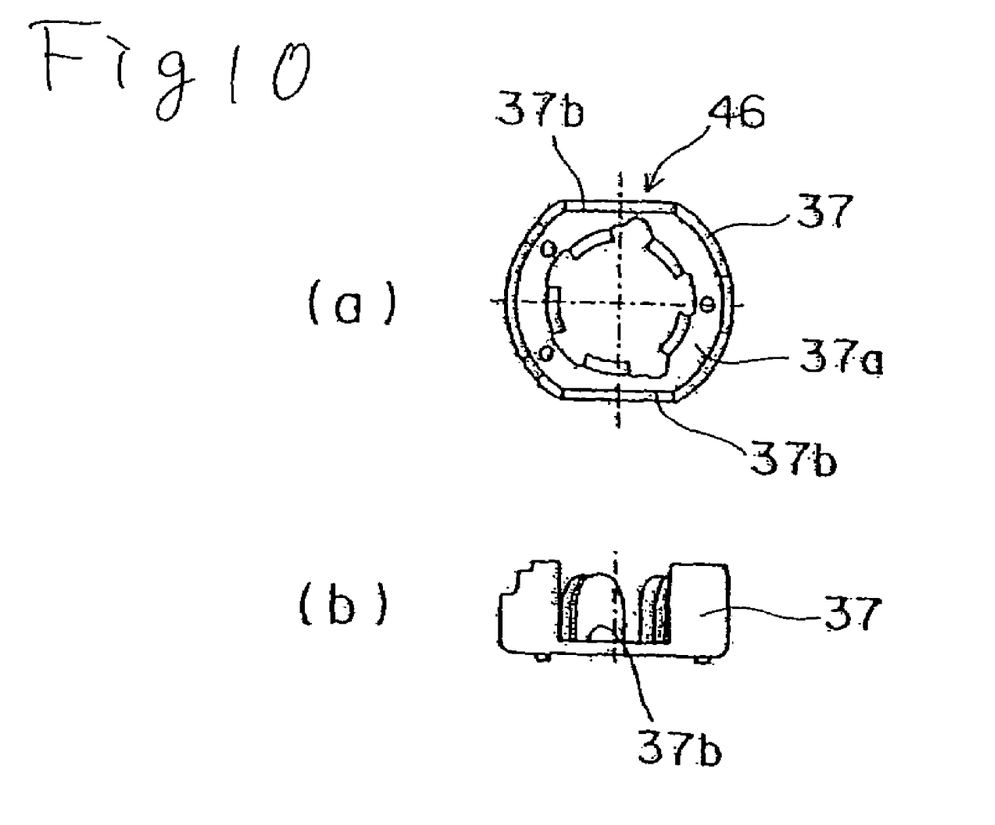
FIG. 10 is a diagram showing a motor case of another example: (a) is a front view and (b) is a side view

Moreover, although first motor case 37 is formed by cutting, in the axial direction, two planes facing each other on the circumferential side plane of a cylindrical shape with a bottom, the mode of embodiment is not limited to this. As shown in FIG. 10, first motor case 37 may have an oval shape by reducing work in which a cylindrical shape has a bottom, and the flat side wall parts may be provided with openings by punching. In this case, a small portion of the edge on the bottom 37a side of opening 46 remains and functions as rib 37b. In this way, deformation of first motor case 37 can be suppressed.

By feeding a given current through air core coils 33 and 34 of stator part 3, the rotor magnet is rotatory energized by the magnetic interaction between stator part 3 and rotor magnet 22, causing rotor shaft 21 integrated into the rotor magnet to rotate as well.

In addition, since the operation of stepping motor 1 is the same as that of a conventional stepping motor or the like of public domain, the detailed description of stepping motor 1 is omitted herein.

Stepping motor 1 is characterized by the fact that it comprises circular first stator core 31 having a plurality of pole teeth raised at the inner circumferential edge and air core coil 33 fitted to the periphery of the pole teeth, wherein insulating film 50 is formed on the surface of this air core coil 33, and insulation sheet 40 is sandwiched between edge 33*h* along the axial direction of the air core coil 33 and the first stator core 31.

According to stepping motor 1, since an insulating film is formed on the surface of the air core coil 33 fitted to the periphery of pole teeth of first stator core 31, insulating film 50 can be formed on the entire surface of air core coil 33 with a given film thickness, and the possibility of breaking or poor insulation can be reduced.

Furthermore, insulation sheet 40 is sandwiched between edge 33*h* along the axial direction of air core coil 33 on which insulating film 50 is formed and the first stator core 31. Since this insulation sheet 40 is more tenacious than insulating film 50, even if it contacts with the burrs generated on first stator core, it covers them, and in air core coil 33, insulation of the angled parts where the insulating film 50 is relatively thinned can be ensured.

Moreover, in stepping motor 1, insulation sheet 40 is fixed onto first stator core 31 and the edge along the axial direction of air core coil 33 with an adhesive.

Thus, since insulation sheet 40 is fixed onto first stator core 31 and the edge along the axial direction of air core coil 33 with an adhesive. As a result, the air core coil 33 is aligned with first stator core 31, and good motor characteristics can be maintained.

Furthermore, also during operation, shifting of air core coil 33 along the axial direction or the radius direction and contacting the members that make up the motor can be prevented. Thus, the possibility of breaking wires, poor insulation, or the like can be controlled.

Furthermore, in stepping motor 1, since the material of the insulation sheet 40 is polyethylene terephthalate, insulation sheet 40 can be made at low cost.

Moreover, also in the stepping motor 1, circular first motor case 37 (the other first stator core) having a plurality of pole teeth raised at the inner circumferential edge is overlaid along the axial direction on first stator core 31, wherein first motor case 37 and the edge of air core coil 33 facing the edge along the axial direction of this first motor case 37 are in the non-contacting state; this enables stepping motor 1 to maintain its insulation at low cost without an insulation member.

While the foregoing description and drawings represent the present invention, it will be obvious to those skilled in the art that various changes may be made therein without departing from the true spirit and scope of the present invention.

What is claimed is:

1. A stepping motor comprising:
   a circular stator core having a plurality of pole teeth raised at an inner circumferential edge;
   an air core coil fitted to the periphery of said pole teeth without a coil bobbin;
   an insulating film being formed on the outer surface of said air core coil with a thickness so that the insulating film serves as an insulating function instead of the coil bobbin; and
   an insulation sheet being sandwiched between an end face along the axial direction of said air core coil and said stator core so as to be capable of preventing burrs from contacting with said air core coil even when the burrs are formed in the stator core.

2. The stepping motor as claimed in claim 1, wherein said insulation sheet comprises a ring-shaped sheet and is fixed between said stator core and the insulating film formed on the end face along the axial direction of said air core coil with an adhesive to ensure insulation at an edge portion of said air core coil.

3. The stepping motor as claimed in claim 1 wherein the material used for said insulation sheet is polyethylene terephthalate.

4. The stepping motor as claimed in claim 1 wherein the material used for said insulation sheet and said insulating film is a polyimide resin.

5. The stepping motor as claimed in claim 1, further comprising another set of a circular stator core, an air core coil, an insulating film and an insulation sheet, wherein the circular stator core in the another set is overlaid along the axial direction on said circular stator core.

6. The stepping motor as claimed in claim 5, wherein said insulation sheet comprises a ring-shaped sheet and is fixed between said stator core and the insulating film formed on the end face along the axial direction of said air core coil with an adhesive to ensure insulation at an edge portion of said air core coil.

7. The stepping motor as claimed in claim 1, wherein the insulating film can be formed on the entire surface of the air core coil with a given film thickness.

8. The stepping motor as claimed in claim 1, wherein a motor case and an edge of the air core coil facing the edge along the axial direction of the motor case are in a non-contacting state.

* * * * *